UNITED STATES PATENT OFFICE.

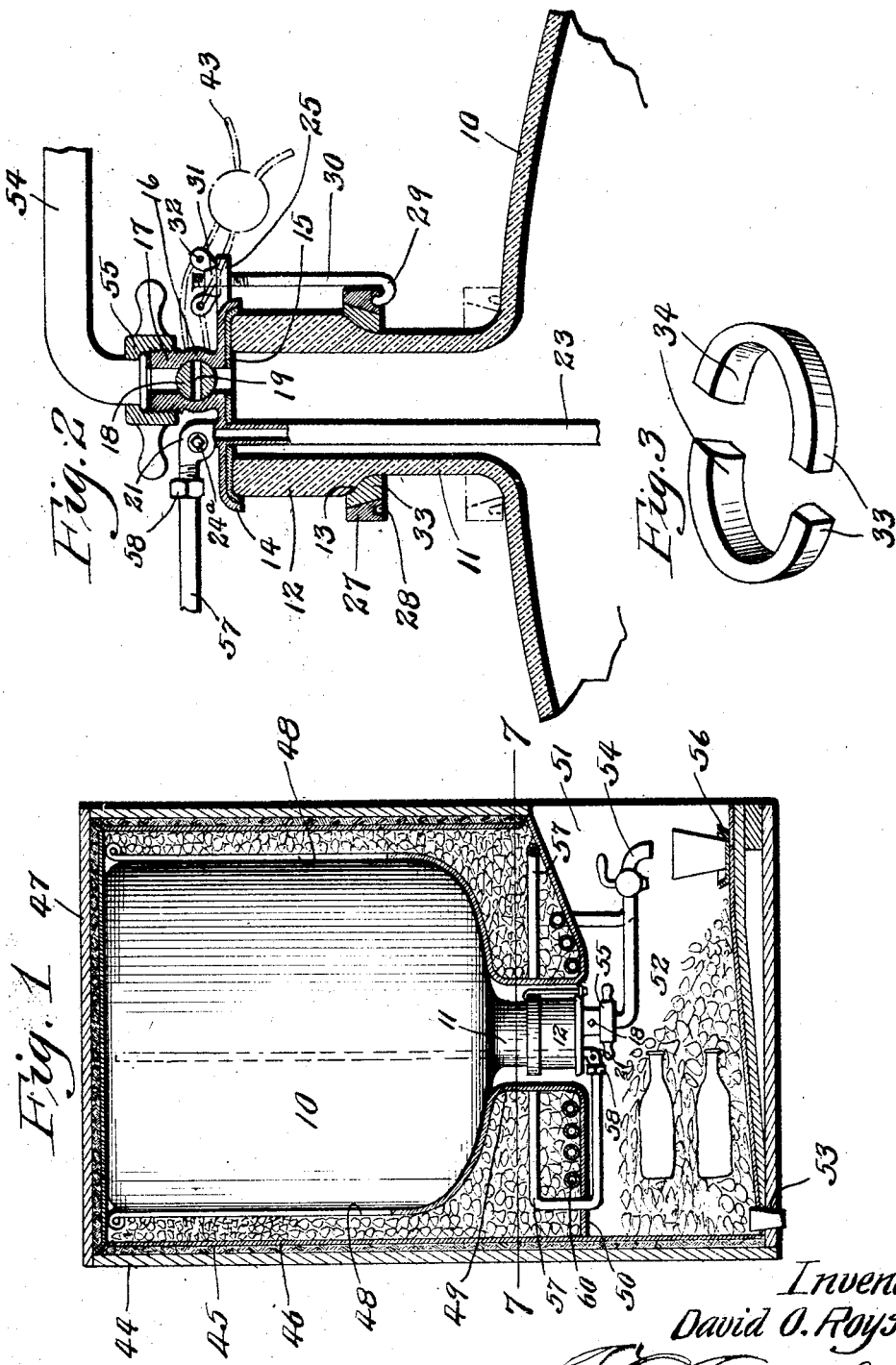

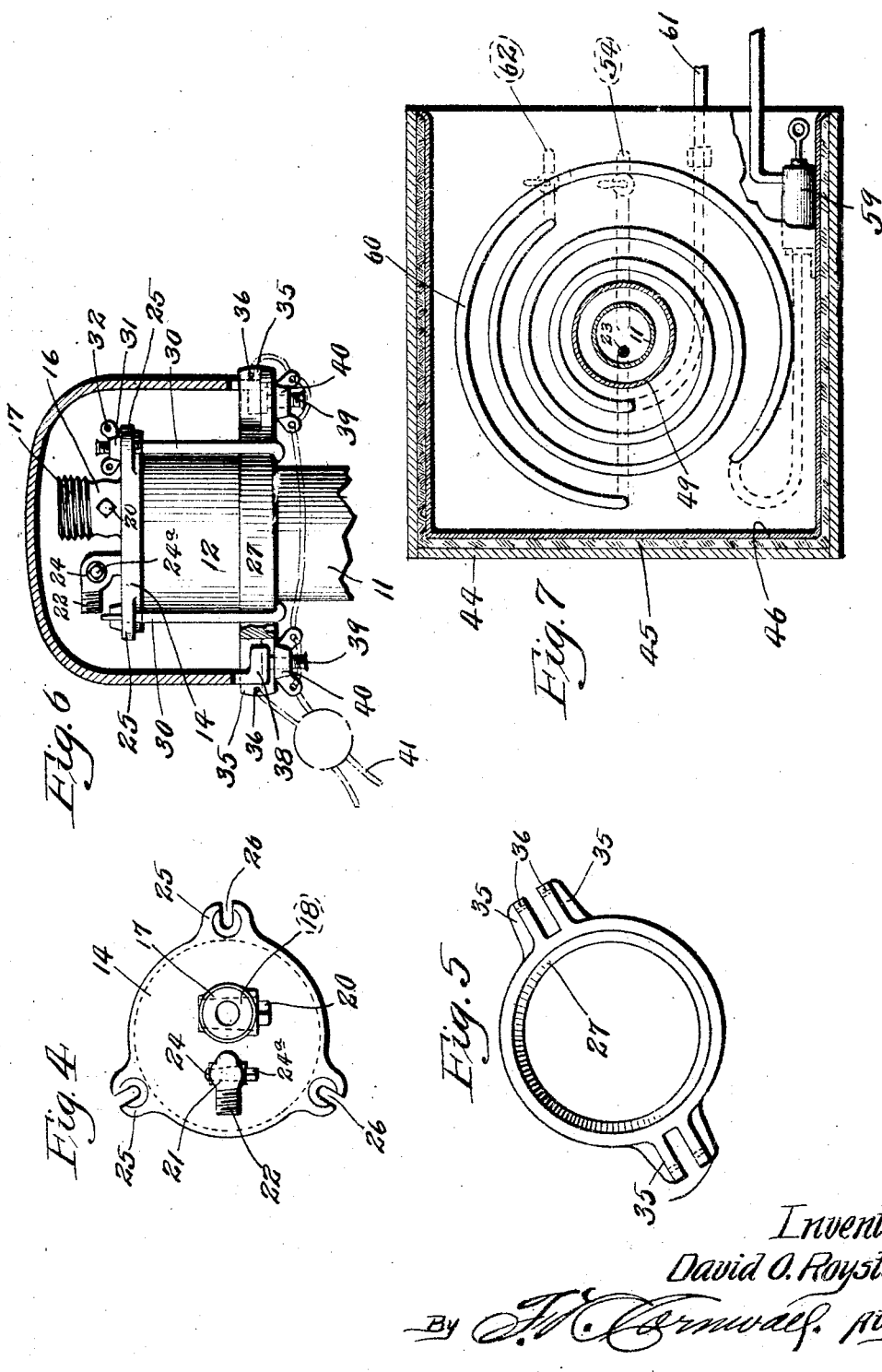

DAVID O. ROYSTER, OF ST. LOUIS, MISSOURI.

BEVERAGE SHIPPING AND DISPENSING RECEPTACLE.

1,381,341.   Specification of Letters Patent.   Patented June 14, 1921.

Application filed September 25, 1917. Serial No. 193,077.

*To all whom it may concern:*

Be it known that I, DAVID O. ROYSTER, a citizen of the United States, residing at St. Louis, Missouri, have invented a certain new and useful Improvement in Beverage Shipping and Dispensing Receptacles, of which the following is a full, clear, and exact description, such as will enable others skilled in the art to which it appertains to make and use the same, reference being had to the accompanying drawings, forming part of this specification.

My invention relates to improvements in containers or receptacles for the storage, shipment, and dispensing of beverages or potable liquids, particularly the various so-called cereal beverages now generally manufactured and sold through the country and also soda-water, ginger-ale, and the like.

It will be understood that in practically all the cereal beverages now manufactured and sold, there is an alcoholic content of not more than one-half of one per cent., and further, that it is the present practice to put up these beverages in comparatively small bottles which are sold to the consumers.

Heretofore it has been impossible to put up the beverages in comparatively large containers and dispense said beverage in comparatively small quantities, and it is one of the objects of my invention to provide a comparatively simple package which includes a large glass bottle or a container having a glazed or enameled inner surface, such provision insuring the maintenance of the beverage in perfect condition from the time it is manufactured until it is dispensed to the consumer.

It is not feasible to use large wooden containers in the shipment of cereal beverages in bulk and the dispensing thereof, for the reason that it is impossible to control the alcoholic content of the beverage while in the wood container. The beverage so contained cannot be pasteurized to prevent fermentation for the reason that the walls of the wood container are porous and foreign vegetable matter will gather in the pores regardless of how well the package is repitched.

My invention contemplates the use of a glass or enameled container having a removable top which will enable the container to be easily filled, said top capable of being securely fastened so as to prevent leakage of the contents or the ingress of air, and said top being also provided with means which can be sealed so as to prevent the package from being tampered with while in storage or transportation.

Further my invention contemplates suitable connections which can be readily made with the closure of the bottle or container, and which connections permit the contents of the container to be dispensed as desired.

My invention further contemplates the use of a suitable housing or casing in which the bottle or package is positioned while the contents are being dispensed, said outer housing being provided with a chamber adapted to receive ice whereby the contents of the package are kept cold.

With the foregoing and other objects in view, my invention consists in certain novel features of construction and arrangement of parts, hereinafter more fully described and claimed and illustrated in the accompanying drawings, in which—

Figure 1 is a vertical section taken through the center of a beverage shipping and dispensing receptacle of my improved construction;

Fig. 2 is an enlarged view taken through the neck and upper portion of the bottle or beverage container and showing the removable cap in position over the mouth of said container;

Fig. 3 is a perspective view of a sectional packing ring forming a part of my invention;

Fig. 4 is a plan view of the cap which is removably positioned on the mouth of the bottle for the purpose of sealing the same;

Fig. 5 is a plan view of a ring which is positioned on the neck of the bottle or container;

Fig. 6 is an elevational view of the upper end of the neck of the bottle or container and showing a cap positioned thereupon which cap is utilized when the container is packed for storage or shipment;

Fig. 7 is a horizontal section taken approximately on the line 7—7 of Fig. 1.

Referring by numerals to the accompanying drawings, which illustrate a practical embodiment of my invention, 10 designates a container, preferably formed of glass or of earthen ware or other material having an enameled or glazed inner surface, and said container being preferably shaped like a bottle with a neck 11 at one end, and said neck terminating in a lip 12, the inner end of which is provided with a shoulder 13. The closure for the mouth of this container comprises a plate 14 formed of block tin or suitable metal heavily coated with tin, said plate being provided on its underside with a packing disk 15 of cork or analogous material. When this closure is properly applied for use, it is arranged with the packing disk 15 bearing directly against the outer edge of the lip 12, as illustrated in Fig. 2.

Formed integral with plate 14 and extending outwardly therefrom is a tubular valve housing 16, the outer end of which is threaded as designated by 17, and arranged for operation within said valve housing is a tapered valve plug 18, the same being provided with a diametrically arranged slot or port 19, and one end of said valve plug terminates in a non-circular shank 20, which latter is adapted to receive a key or wrench whereby the valve may be rotated into open or closed position.

Formed integral with plate 14 is an elbow-shaped valve housing 21, the outer end of which is threaded as designated by 22, and connected to the inner end of this elbow is an air inlet tube 23, preferably of block tin, glass or enameled material, said tube being of such length as to extend almost to the bottom of the container 10. Arranged for operation within this valve housing 21 is a tapered valve plug 24 provided with a diametrically arranged slot or port which is adapted to register with the passageway through the valve housing, and one end of said valve plug terminates in a square or non-circular stem 24$^a$ which is adapted to receive an operating key or handle.

Formed integral with the edge of plate 14 and projecting outwardly therefrom are lugs or ears 25, the same being provided with short radially disposed slots 26, the outer ends of which are open.

A ring 27, preferably of metal and of such size as to slip freely downward over lip 12 is provided in its underside with a groove 28, which latter is adapted to receive the ends of hooks 29 which are formed on the lower ends of clamping members 30. These members are in the form of short rods, the upper ends of which are threaded and adapted to occupy the slots 26 in ears 25. Screw-seated on the upper ends of these clamping members are winged nuts 31, the wings of which are provided with apertures 32.

The inner face of ring 27 is beveled and adapted to fit within said ring and bear against said face is a two-part packing ring 33, the inner face 34 of which is curved so as to fit snugly against shoulder 13 at the lower end of lip 12.

When it is desired to firmly seat the plate 14 on the mouth of the container to close and seal the same, the two-part packing ring 33 is positioned within ring 27 and the two rings are now shifted upon neck 11 until the inner face of packing ring 33 bears against shoulder 13. The hooks 29 at the lower ends of the clamping members 20 are now engaged in groove 28 and the upper ends of said clamping members are positioned in slots 26.

The winged nuts 31 are now manipulated so as to bear on top of ears or lugs 25, and as these nuts are tightened, the rings 27 and 23 will be drawn upward to engage with considerable pressure against shoulder 13 and at the same time plate 14 will be firmly pressed against the outer edge of lip 12.

The beverage forming the contents of the container is now delivered through the tubular valve housing 16, it being understood that valve 18 is moved into open position, and after the container has been filled, said valve 18 and valve 24 are closed, thus effectually preventing the ingress of air into the container, and likewise preventing the escape of air or beverage from said container.

With the mouth of the container thus effectually sealed, the package and its contents can be readily pasteurized to arrest and hold fermentation of the contents, and after pasteurizing, the package may be subjected to any normal temperatures without affecting the contents. Thus the package can be shipped and stored without the necessity of its being placed in cold storage or in a refrigerator car, and consequently the package and its contents can be very economically handled from the manufacturer to the retailer.

Another desirable feature in connection with my improved means of packaging comparatively large quantities of beverage for storage and shipment, is the advantage in weight as compared to the present methods of shipping and storing beverages, for the total weight of a package of my improved construction for a given quantity of beverage is materially less than the weight of a package under the present practice. This advantage results in a material saving of transportation charges.

Ring 27 which supports the two-part packing ring 33 is provided with two or more pairs of outwardly projecting ears 35, and the outer ends of these ears are perforated as designated by 36 in order to receive a sealing wire, as hereinafter more fully explained.

When the container is packed for storage or transportation, a metal cap 37 of sufficient size to inclose the upper end of the neck of the bottle, the plate 14 and parts carried thereby, is placed upon said plate, and when so positioned, the lower end of this cap 37 rests directly on top of the pairs of ears 35. (See Fig. 6.)

Formed integral with the lower edge of this cap are depending lugs 38 which fit snugly into the slots or spaces between the pairs of ears 35 and depending from said lugs 38 are threaded stems 39 which receive winged nuts 40. When these winged nuts are tightened upon the stems 39, the cap 37 is drawn downwardly into close engagement with the tops of the ears 35, thereby forming an effective cover for the upper end of the neck of the bottle and the closure parts positioned thereupon.

The wings of the nuts 40 are perforated in order to receive a sealing wire 41, the latter passing through the wings of all of the nuts and through the perforations 36 in ears 34, and the ends of said wire being brought together and secured by a suitable seal 42. (See Fig. 6.) This arrangement serves to prevent the package from being tampered with while in storage or transportation, and to further seal the package, a suitable sealing wire such as 43 can be threaded through the apertures 32 in the wings of nuts 31. (See Fig. 2.).

The cooling and dispensing box or container utilized in connection with my improved receptacle is illustrated in Figs. 1 and 7, and includes a substantially rectangular box 44 of wood or metal, the same being preferably lined with a layer 45 of heat insulating material and with an inner wall or layer 46 of sheet metal, the same holding the insulating material in place and serving to make the box substantially water-tight. This box is provided with a removable cover 47 and with a vertically disposed metal wall 48 of sufficient size to receive the bottle or container 10, this wall being spaced apart from the wall 46 so as to provide a chamber which can be packed with ice. The lower portion of wall 48 extends inwardly toward the center of the box and is then extended downward to form a comparatively small tubular wall 49 which receives the neck of the bottle or container when the same is inverted and from the lower end of this tubular wall 49, the metal is extended outward to the lining 46 as designated by 50 to form a bottom for the ice chamber. The upper portion of wall 48 is perforated in order to permit cool air to circulate from the ice space into the space occupied by the container 10.

A portion of the front wall of the box is removed below the corresponding portion 50 of the metal wall to form an opening 51 into the chamber in which the dispensing connections are located. This chamber designated by the numeral 52 is located between the bottom of the box, and the horizontally disposed walls 50, and the rear portion of the bottom of the box below this chamber is preferably inclined downward and rearwardly, there being a normally closed outlet 53 at the rear end of said inclined bottom.

Chamber 52 is adapted to contain chipped ice and the latter can be utilized for cooling beverages contained in comparatively small bottles.

When the bottle or container 10 is positioned in the dispensing box, it is inverted and its neck 11 and the parts carried thereby extend downward through tubular member 49. The inner end of a dispensing faucet 54 is connected to the threaded end of tubular valve stem 16 by means of a union 55 and when valve 18 is turned into open position, the contents of the bottle or container can be drawn through said faucet 54, as desired. This faucet 54 extends outward toward the open end of chamber 52 and its discharge end is positioned directly over a glass receiving plate 56, the latter being located on the bottom of the box.

Located in the bottom of the ice chamber above the horizontally disposed wall 50 is an air pipe 57, one end of which leads downward into chamber 52 and said end being secured to the threaded end 22 of elbow 21 by means of a union 58. The opposite end of this air pipe is connected to an air pump 59, the latter being located in chamber 52 near the front thereof. By this construction, all air entering the bottle or container 10 is cooled in passing through pipe 57, which latter is located in the bottom of the ice chamber around said bottle or container, and if the pressure should become low in said bottle, additional pressure can be created by proper manipulation of air pump 59.

Located in the ice chamber adjacent to pipe 57 is a coiled pipe 60, one end of which is connected to a water supply pipe 61, and the opposite end being provided with a faucet 62 which is positioned within chamber 52 adjacent to faucet 54. This arrangement provides means for maintaining in the dispensing apparatus a supply of water, the same being cooled as it passes through the coil 60, and which latter is located in the ice compartment.

A shipping and dispensing receptacle of my improved construction is comparatively simple, is particularly applicable for handling in comparatively large packages the cereal beverages which are now generally manufactured and sold throughout the country, and by virtue of the peculiar construction of the container and the improved means of sealing the same, the contents of said container can be pasteurized, thus permitting the package to be later stored and shipped in any normal temperature without injury or deleterious results.

Further, my improved construction provides a container which can be very economically used in the handling of all kinds of liquids which are necessarily shipped from manufacturer to retailer, and when the container is positioned in the dispensing receptacle, it can be very easily and economically cooled, and in such condition dispensed to the trade.

It will be readily understood that minor changes in the size, form and construction of the various parts of my improved shipping and dispensing receptacle can be made and substituted for those herein shown and described, without departing from the spirit of my invention, the scope of which is set forth in the appended claims.

I claim:

1. In a beverage shipping and dispensing receptacle, a housing, a partition therein, which partition divides the space within the housing into upper and lower compartments, the same being connected by an opening, a wall arranged within the upper compartment to form a container chamber and an ice chamber, a container located in the container chamber and provided with a tubular extension which projects downward between the opening in the upper and lower chambers of the housing, means normally closing the mouth of the tubular neck, a tube leading from said closing means downwardly into the lower chamber within the housing, a valve near said tube, an air tube extending through the closing means, a portion of which tube is arranged in the lower portion of the ice chamber, and a valve in said air tube.

2. In a beverage shipping and dispensing receptacle, a housing, a partition therein, which partition divides the space within the housing into upper and lower compartments, the same being connected by an opening, a wall arranged within the upper compartment to form a container chamber and an ice chamber, a container located in the container chamber and provided with a tubular extension which projects downward between the opening in the upper and lower chambers of the housing, means normally closing the mouth of the tubular neck, a tube leading from said closing means downwardly into the lower chamber within the housing, a valve near said tube, an air tube extending through the closing means, a portion of which tube is arranged in the lower portion of the ice chamber, a valve in said air tube, and a pipe arranged in the form of a coil and positioned in the lower portion of the ice compartment, one end of which pipe extends downwardly into the chamber in the lower portion of the housing, and the other end of said pipe adapted to be connected to a water supply pipe.

3. In a beverage shipping and dispensing receptacle, a housing, a partition dividing the space within said housing into upper and lower compartments, the front of the lower compartment being open, there being an opening in the center of said partition, a wall extending upwardly from said partition around said opening to form a container chamber and an ice chamber, a container positioned within the container chamber, a tubular neck depending from said container and extending through the opening in the partition, a closure plate detachably applied to the end of the tubular neck, valves on said closure plate, a faucet detachably connected to one of said valves, an air pipe connected to the other one of said valves, a portion of which air pipe occupies the lower portion of the ice chamber and another portion extending through the closure plate upwardly into the container 4. In a beverage shipping and dispensing receptacle, a housing, a partition dividing the space within said housing into upper and lower compartments, the front of the lower compartment being open, there being an opening in the center of said partition, a wall extending upwardly from said partition around said opening to form a container chamber and an ice chamber, a container positioned within the container chamber, a tubular neck depending from said container and extending through the opening in the partition, a closure plate detachably applied to the end of the tubular neck, valves on said closure plate, a faucet detachably connected to one of said valves, an air pipe connecting the other one of said valves, a portion of which air pipe occupies the lower portion of the ice chamber and another portion extending through the closure plate upwardly into the container, and a pump connected to said air pipe.

5. In a beverage shipping and dispensing receptacle, a housing, a partition dividing the space within said housing into upper and lower compartments, the front of the lower compartment being open, there being an opening in the center of said partition, a wall extending upwardly from said partition around said opening to form a container chamber and an ice chamber, a beverage container positioned within the container chamber, said container having a tubular neck which depends through the opening in the partition, a closure plate detachably applied to the end of the tubular neck, and means on said plate for receiving tubular connections.

6. In a beverage shipping and dispensing receptacle, a housing, a partition dividing the space within said housing into upper and lower compartments, the front of the lower compartment being open, the bottom of said lower compartment being inclined downwardly toward its rear end, there being a normally closed drain opening formed at the lower end of said inclined bottom, there being an opening in the center of said partition, a wall extending upwardly from said partition around said opening to form a container chamber and an ice chamber, a beverage container positioned within the container chamber, said container having a tubular neck which depends through the opening in the partition, a closure plate detachably applied to the end of the tubular neck, and means on said plate for receiving tubular connections.

7. In a beverage shipping and dispensing receptacle, a housing, a partition dividing the space within said housing into upper and lower compartments, the front of the lower compartment being open, there being an opening in the center of said partition, a container removably arranged in the upper compartment and having a neck extending downwardly through the opening in the partition, a closure plate detachably applied to the end of the tubular neck, a faucet connected to said plate, and an air pipe secured to and extending through said plate.

8. In a beverage shipping and dispensing receptacle, a housing, a partition dividing the space within said housing into upper and lower compartments, the front of the lower compartment being open, there being an opening in the center of said partition, a container removably arranged in the upper compartment and having a neck extending downwardly through the opening in the partition, a closure plate detachably applied to the end of the tubular neck, nipples projecting from said closure plate, valves in said nipples, a faucet connected to one of said nipples, and an air pipe connected to the other nipple.

In testimony whereof I hereunto affix my signature this 21st day of September, 1917.

DAVID O. ROYSTER.